(12) United States Patent
Gerson et al.

(10) Patent No.: US 8,550,909 B2
(45) Date of Patent: Oct. 8, 2013

(54) GEOGRAPHIC DATA ACQUISITION BY USER MOTIVATION

(75) Inventors: Elad Gerson, Seattle, WA (US); Eyal Ofek, Redmond, WA (US); Limor Lahiani, Tel Aviv (IL); Brian Beckman, Newcastle, WA (US); Ido Omer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/157,332

(22) Filed: Jun. 10, 2011

(65) Prior Publication Data

US 2012/0315992 A1 Dec. 13, 2012

(51) Int. Cl.
*A63F 9/24* (2006.01)
(52) U.S. Cl.
USPC .......................................... 463/31; 348/14.01
(58) Field of Classification Search
USPC .................................. 463/25–42; 348/14.01
See application file for complete search history.

(56) References Cited

U.S. PATENT DOCUMENTS

| | | | |
|---|---|---|---|
| 2006/0038833 A1 | 2/2006 | Mallinson et al. | |
| 2006/0105838 A1 | 5/2006 | Mullen | |
| 2009/0017913 A1* | 1/2009 | Bell et al. | 463/40 |
| 2009/0167787 A1 | 7/2009 | Bathiche et al. | |
| 2009/0265105 A1* | 10/2009 | Davis et al. | 701/300 |
| 2010/0045701 A1 | 2/2010 | Scott et al. | |
| 2010/0048307 A1 | 2/2010 | Uhlir et al. | |
| 2010/0066750 A1 | 3/2010 | Yu et al. | |
| 2010/0279776 A1* | 11/2010 | Hall | 463/42 |
| 2011/0065496 A1 | 3/2011 | Gagner et al. | |
| 2011/0098056 A1* | 4/2011 | Rhoads et al. | 455/456.1 |
| 2012/0069131 A1* | 3/2012 | Abelow | 348/14.01 |
| 2012/0122558 A1* | 5/2012 | Lyons et al. | 463/25 |
| 2012/0122570 A1* | 5/2012 | Baronoff | 463/31 |

FOREIGN PATENT DOCUMENTS

| | | |
|---|---|---|
| JP | 2005337863 A | 12/2005 |
| KR | 100868733 B1 | 11/2008 |

OTHER PUBLICATIONS

Tiensyrja, Juha, "Panoulu Conqueror"—A Pervasive Location-Based Game for the Panoulu Network, Retrieved at << http://www.mediateam.oulu.fi/publications/pdf/1374.pdf >>, 2010.

Bimber, et al., "Alternative Augmented Reality Approaches: Concepts, Techniques, and Applications", Retrieved at << http://140.78.90.140/medien/ar/Pub/EG03_course_notes.pdf >>, The Eurographics Association, 2003.

Henrysson, Anders, "Bringing Augmented Reality to Mobile Phones", Retrieved at << http://liu.diva-portal.org/smash/get/diva2:16967/FULLTEXT01 >>, 2007.

(Continued)

*Primary Examiner* — Masud Ahmed

(57) ABSTRACT

Architecture that motivates and utilizes users as the means for capturing geographical data of a desired location. The architecture incentivizes users (e.g., large numbers of mobile-phone and mobile-computer users) to provide the data in the form of geolocation information trails and images captured by user devices. Thus, users take multiple pictures, for example, and can validate existing coverage of specific points of interest based on variable needs of the requestor. One motivational technique is by using augmented reality (AR) games, which include shooting targets associated with the point of interest (e.g., a street). Thus, the game can be designed for the data accumulation, which includes visual data. Additionally, the architecture can determine the areas or points of interest for validation and/or additional coverage by comparing live video data to an image database to decide of the need for update.

20 Claims, 9 Drawing Sheets

(56) References Cited

OTHER PUBLICATIONS

"Bismarck Demon Football camp info Jun. 30-Jul. 2", Retrieved at << http://www2.bhs.bismarck.k12.nd.us/athletics/football/07site.htm >>, Retrieved Date : Mar. 24, 2011.

"Magician Football", Retrieved at << http://www.minot.k12.nd.us/education/components/scrapbook/default.php?sectionid=1399 >>, Mar. 24, 2011.

"International Search Report", Mail Date: Dec. 26, 2012, Application No. PCT/US2012/040636, Filed date: Jun. 3, 2012, pp. 9.

* cited by examiner

GEOGRAPHIC DATA ACQUISITION BY USER MOTIVATION

BACKGROUND

The majority of roads, trails, and other routes in the interior (e.g., non-urban) of a country or remote areas lack accurate and up-to-date vector and topological data. Vector data includes high-precision latitudes and longitudes along the route, and topological data includes junctions, intersections, connections, and available turns. Accordingly, there is a demand for techniques that can capture this information in a cost-effective way.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture motivates and utilizes users as the means for capturing the desired geographical data. The architecture incentivizes users (e.g., large numbers of mobile-phone and mobile-computer users, as well as general computer users) to provide the data in the form of geolocation information trails and images captured by user devices. This approach attains high quality data which is comparable or better than the data obtained using highly skilled professionals without the associated costs.

In order to achieve good street image coverage, for example, incentivizing users to take pictures of areas which lack in coverage is a useful component in the overall task of collecting geographical data of roads and features. Thus, users take multiple pictures, for example, and can validate existing coverage of specific points of interest based on variable needs of the requestor.

One motivational technique is by using augmented reality (AR) games, which include shooting targets associated with the point of interest (e.g., a street). Thus, the game can be designed for the data accumulation, which includes visual data. Additionally, the architecture can determine the areas or points of interest for validation and/or additional coverage by comparing live video data to an image database to determine the need for update.

In one implementation, teams (e.g., athletic, debate, football, cheerleaders, etc.) in an area of interest are created and placed in a competitive venue to paint a map virtually using school colors based on points of interest deemed to need validated or improved coverage. The winner is the team that paints (digitally captures or validates) the most territory (e.g., roads) in the area of interest specified by the requestor. This can be accomplished by activating the geolocation system (e.g., GPS-global positioning system) in the user cell phone and then driving along more roads than the competitors, organizing Open Street Map (a collaborative project where a map is created by volunteers) parties, and taking multitudes of images while traveling on the designated roads.

Gameplay can be crafted in realtime based on variable needs of the requestor in space and time. Users are invited to areas (or locations) of interest where there is the need for coverage. The game script lures (motivates) users along routes that may need updating by taking photos. While taking the photo, users are encouraged to remain steady in order to capture a better picture or to capture a wide angle panorama for example. Data is gathered and validated using multiple sources of the data such as via a multiplayer game. In the game, designated points of interest are determined, marked, and targeted for interaction in realtime. For example, if there is a change (a delta) associated with a previously captured location and the current status of the location, threats (foes) can be generated instantly on the delta features of the point of interest.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
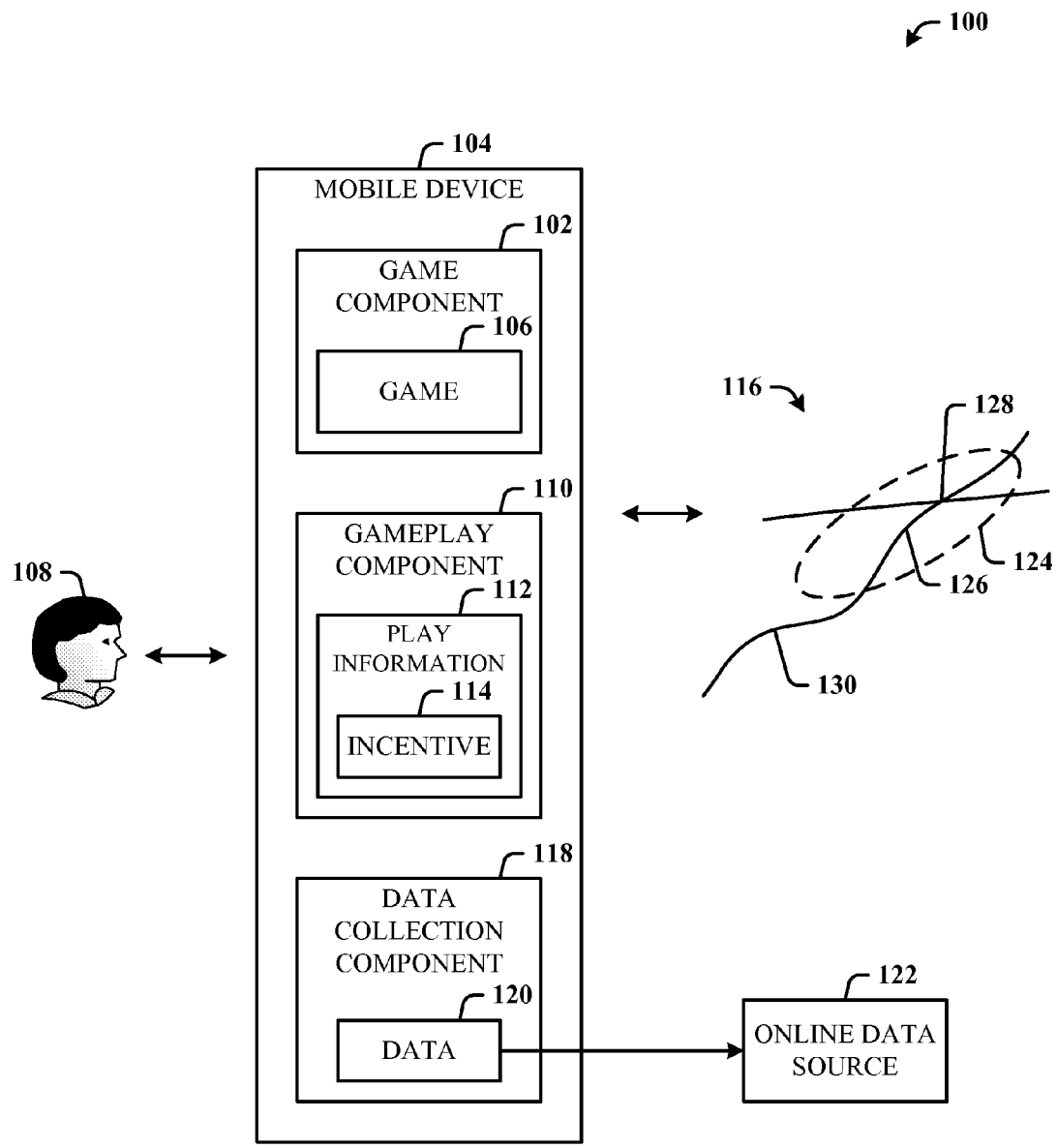
FIG. 1 illustrates a data collection system in accordance with the disclosed architecture.

The disclosed architecture employs incentives to motivate users to engage in gameplay that ultimately result in images being captured of geographical areas of interest. In one implementation, the architecture utilizes an augmented reality (AR) first-person shooter single-player game, where a handheld device (e.g., mobile phone) is used as the weapon's scope and game foes are added on top of the real world images captured by the phone's camera. A backend server crafts the gameplay, and set foes in specific points of interest, thus, sending the players to the desired geographical locations to hunt the foes while aiming the device's camera to take images of area's which lack coverage.

When a user arrives at the area of interest, the targets and resources are positioned at locations that need updates (e.g., junction signs, business signs, etc.). The user shoots (interacts with) the targets, and by doing so, stabilizes the phone in the target direction and captures an image.

The foes and resources can be controlled by a backend server, which enables the spawning of new foes instantly, if during gameplay, it is determined that some of the existing coverage (images) is no longer accurate (e.g., due to new or changed road signs). This enables the capability to instantly correct or improve the coverage of that area or point of interest.

When launching a multiplayer game, this enables the obtainment of information from multiple sources (and angles), thereby receiving a higher quality and more complete picture of the area of interest. Multiple users can also be utilized as a means of validation of each other's data. For example, consider that a first team shoots targets, and the images that were used to catch the targets are posted online. A competing team can revive the targets by trying to mimic the same shot that was used to kill the target. By doing so, the team verifies the capture position and orientation of the first team. A similar concept can use transfer of resources between players by replaying the same photograph angle.

The ongoing results of the games can be presented publicly so that other players and non-players can watch the gameplay progress. The results (e.g., colors, blazons, mascots, etc.) may be made publicly visible on the maps, so the incentive includes public bragging rights as well as team rivalries. The results can be made to change (e.g., fade) over time (e.g., age out), thus, players need to maintain their efforts to hold on to territory. It is also within contemplation that some or all of the results can be restricted to viewing by players only.

As the user plays, the graphics of the game are presented over a camera image. Low resolution images of the same scene can be downloaded and presented in the background. If a major change in the scene is detected, as compared to the current camera feed (e.g., a new building, new business sign, etc.) the game can be scripted to show a new target (e.g., a ghost that goes through a building) in the position that needs to be updated, thereby attracting the gamer to keep that view stable, and capture the view.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a data collection system 100 in accordance with the disclosed architecture. The system 100 includes a game component 102 of a mobile device 104 that executes a game 106 (e.g., interactive) for gameplay by a user 108 of the mobile device 104. A gameplay component 110 provides play information 112 to the game component 102. The play information 112 includes an incentive 114 to motivate the user 108 to participate in the gameplay relative to a geographical location 116. A data collection component 118 collects data 120 related to the geographical location 116 during the gameplay.

The data collection component 118 includes sensors of the mobile device 104. The sensors can include a camera that captures images of the geographic location 116 during the gameplay, a microphone that captures audio signals associated with the location 116, an accelerometer that captures orientation data of the device 104, a geolocation subsystem (e.g., GPS-global positioning system), user input, and so on. As inferred, different modalities can be captured, including, but not limited to, GPS trails, images, background audio, texture of surfaces (e.g., ground, floors, etc.), near infrared captures, Wi-Fi reception, etc.

The location 116 may be recovered from electromagnetic beacons (e.g., infrared light, Wi-Fi antennas, RF (radio frequency) tags, etc.), may be recovered from image matching to positioned images and models, from surveillance cameras, etc. It is to be understood that the location 116 may be an outdoor location, or a combination of indoor and outdoor locations.

The gameplay component 110 can receive previously captured data associated with a stale geographic location (a geographic location that has not been reviewed or captured for a period of time) and updates the previously captured data via the mobile device 104 during gameplay. The gameplay component 110 receives previously captured location data associated with a geographic location that is stale (e.g., the location 116) and dynamically influences the gameplay via the play information 112 to occur at the geographic location (that is stale) to update the location data of the geographic location (that is stale). The gameplay component 110 receives previously captured location data associated with a geographic location that is stale (e.g., location 116) and dynamically influences the gameplay via the play information 112 to occur at the geographic location (that is stale) to validate current state of the location data (e.g., data that was previously captured and stored) for the geographic location (that is stale).

The collected data 120 is uploaded from the mobile device 104 to an online data source 122 to update vector and topological information of a geographical mapping system. The game component 102 communicates with an online mapping service (e.g., the online data source 122) that provides a map of an area of interest 124 in which the gameplay occurs. The gameplay component 110 imposes virtual territories (e.g., bounded virtual polygons) on the area of interest 124 and incentivizes users of mobile devices with rewards (e.g., color, avatar, school colors, team banners, etc.) in response to navigation (e.g., driving, riding, hiking, walking) of the area of interest 124 as part of the gameplay. The navigation (e.g., driving along a stipulated route) can result in a geolocation information trail (e.g., GPS data) which is utilized to map the area of interest 124.

The incentive can be to compete and win against a team of competing users (e.g., opposing high school) and the reward includes graphically and virtually presenting captured territory on the map of the area of interest 124 in accordance with a winning team identifier (e.g., team banner, school colors, etc.). The gameplay component 110 incentivizes the gameplay, which can be according to an area-based game (e.g., capture a geographical area). The gameplay can be in a geographical area of interest 124 desired to be mapped (newly, updated) or validated (confirmed as updated based on the latest images). An incentive can be a group identifier (e.g., team banner, school colors, etc.) virtually presented in association with captured or navigated territory of an online map of the area of interest 124.

As illustrated, the geographical location 116 includes the area of interest 124. The area of interest 124 can further include geographical features such as roads 126 and intersections 128. The geographic location 116 can include a route 130 along which users are directed to navigate (e.g., walk, ride, etc.), and in response to which the associated user mobile device is controlled (e.g., manually and/or automatically) to sense (e.g., capture images by camera) features and generate a GPS trail of coordinates that ultimately are used to define the route topology.

Figure 2:
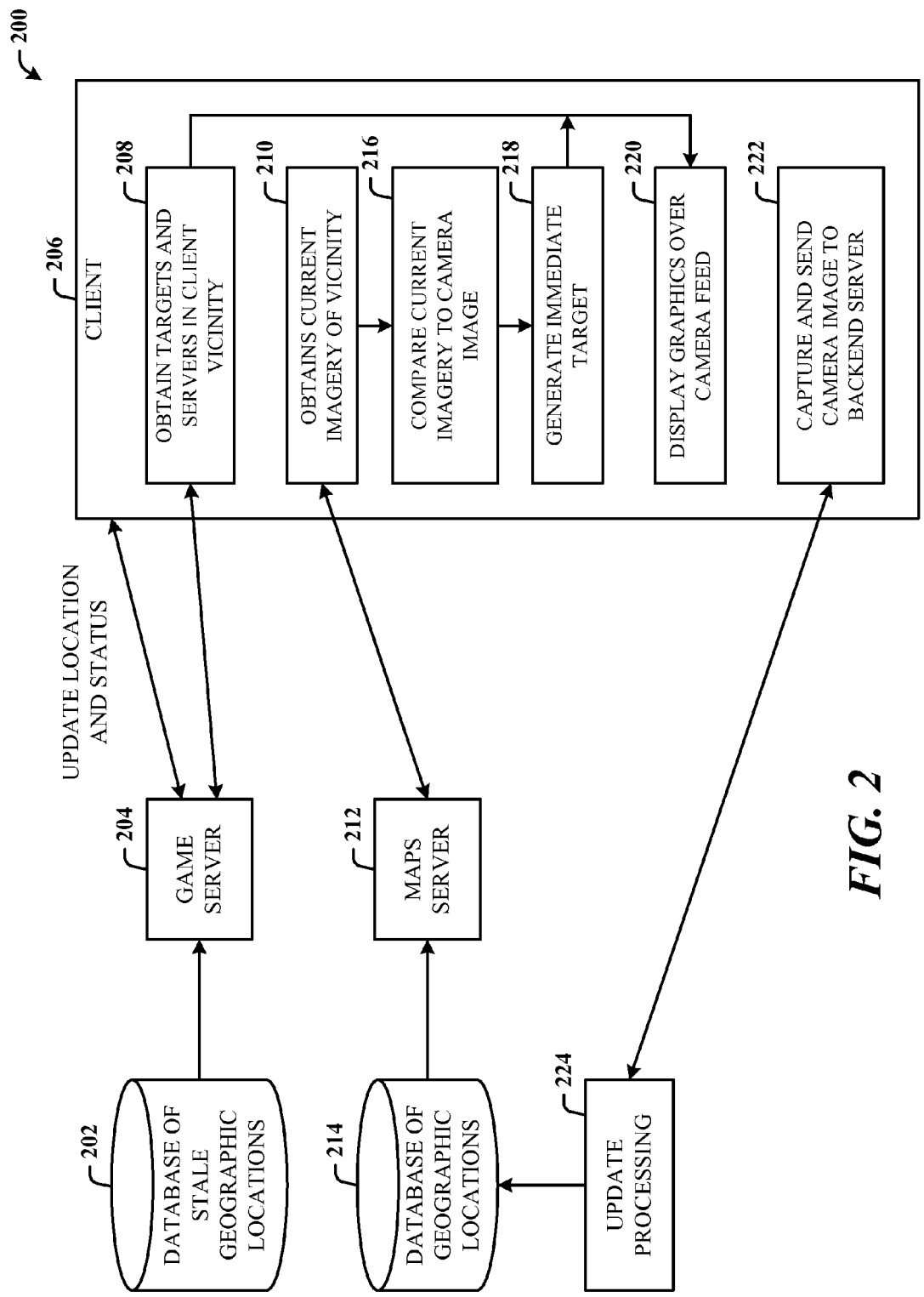
FIG. 2 illustrates a more specific embodiment of a data collection system.

FIG. 2 illustrates a more specific embodiment of a data collection system 200. The system 200 includes a database 202 of stale geographic locations that interface to a game server 204. The game server 204 can communicate with a client 206 (e.g., mobile) that runs (executes) the associated game (e.g., area-based). As part of game execution, the client 206 obtains information related to targets and servers in the vicinity (e.g., within image camera range of the mobile device of the client 206) of the geographic location (and/or area of interest), as indicated at 208. This facilitates more efficient performance by utilizing servers nearby (e.g., a few hops).

Concurrently or sequentially, the client 206 obtains the current imagery of the geographical features, as indicated at 210, from a maps server 212 (or mapping service). The maps server 212 interfaces to a database 214 of geographic locations, which can be street images, for example, and/or other types of topological features (e.g., buildings, structures, scenery, etc.).

Although not depicted, the database 202 and database 214 can intercommunicate to pass the stale geographic locations from the database 214 to the database 202. It is also to be appreciated that the database 202 and database 214 can be part of a single database system.

After the current imagery is obtained, at 210, flow is to 216, where the client 206 compares the current imagery to the camera image. At 218, a target is immediately generated and imposed in association with any detected change between the imagery and the camera image. Flow is then to 220 where the targets (a type of goal) are then displayed (e.g., overlayed) is association with graphics over the camera feed. Once the latest image is captured, as indicated as 222, the image is sent to the database 214 via an update processing step 224.

Figure 3:
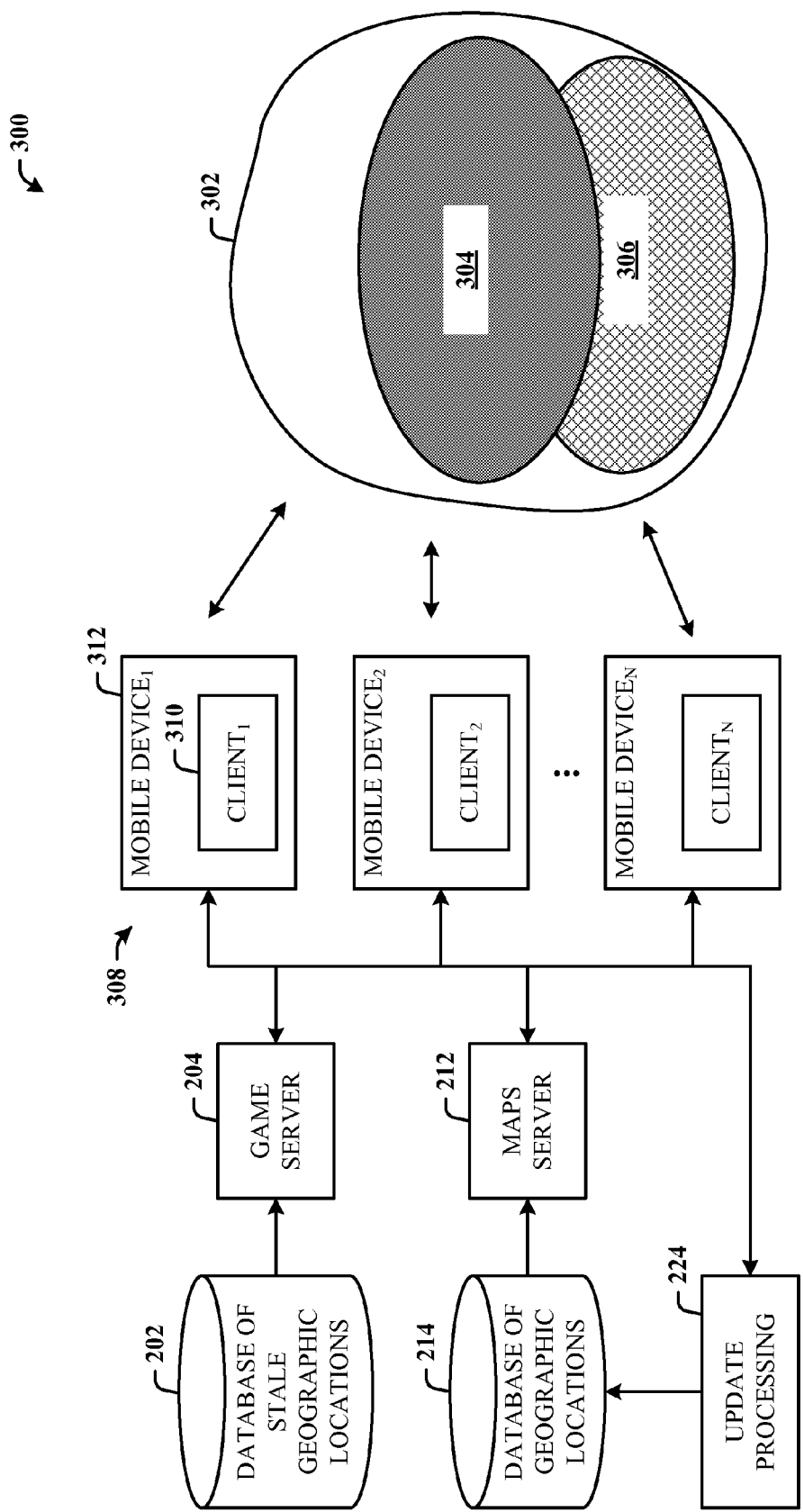
FIG. 3 illustrates a system of data collection that involves multiple users and corresponding mobile devices in a multi-player game.

FIG. 3 illustrates a system 300 of data collection that involves multiple users and corresponding mobile devices (e.g., mobile phones) in a multiplayer game. Here, the game is an area-based game where play is directed in accordance with a territory 302. The game purpose can be to capture areas (304 and 306) of the territory 302 or all of the territory 302. Within the territory 302 are locations of interest such as intersections, roads, routes, structures, etc., that are desired to be imaged and used by the map server 212.

In order to capture the desired images of the geographic locations in the territory 302, the game server 204 initiates game clients in mobile devices 308 of users, for example, a first game client 310 of a first mobile device 312. The users of the devices 308 can form teams that compete against each other. In a more specific example, two schools are placed in competition of overlapping areas the result of which will ultimately provide a more complete image library of locations of interest in the territory 302.

In other words, it is desired that a group paint the map of overlapping areas with corresponding school colors by mapping more roads in the territory 302 by turning on the geolocation subsystem (e.g., GPS) in cell phones and then driving along more roads in the territory 302 than the competing team and taking many images along the way.

Area-based games can be utilized that incentivize users to "capture territory" by driving, riding, walking, or biking roads with mobile-phone GPS, for example, by manually mapping in the maps server 212, and by taking pictures with the mobile-phone camera. Existing loyalties such as "school colors" can be used to incent users to compete against rivals to capture more virtual territory. The winning teams, measured in miles mapped (or other suitable measures), will have their school colors and mascots displayed in the maps.

"Surround-and-Capture" games can be utilized in which players compete by driving geometrical boundaries and capturing territory, resulting in the territory being painted in the associated school colors. Opponents can recapture territory by penetrating the boundary and mapping more miles (or other suitable measure) "behind enemy lines".

"Capture-the-Flag" games can be used in which players compete to grab a virtual "flag" and carry the flag back to the home territory, resulting in the entire region to appear in the map in their school colors.

A map-more-miles game simply plays by mapping more miles than the competing teams to win the territory.

The competition areas, territories, and/or regions can be determined by semi-automated analysis of football leagues, for example. Larger regions can be partitioned into regions in which pairs of teams compete to have the official maps painted in their team colors and with their mascot avatar displayed on the official site.

Every weekend of the season, thousands of teams drive in busses to an opponent's school to compete. Many of these trips are in poorly mapped areas of the country, where GPS data from cell phones can provide massive improvements to digital maps. Accordingly, such roads can be marked according to GPS trails by simply incentivizing users to turn on the GPS systems in the user's phones.

In a more specific example, territorial games can be employed in which players identify with a team, post school colors, a mascot avatar and other accoutrements the teams want displayed on online maps, and then go out to compete in specific territories to capture and upload more GPS information, images, and manual-input data than the competitors in the region.

Additionally, a graph can be constructed with teams at the vertices. For each team X, one edge is added for each competitor team in team X's league. Team X and all competitors divide their shared area via Voronoi diagram analysis, for example. Teams X and Y can share a pair of Voronoi regions, and the challenge goes out to map more roads than the opposing team. The map server will then display school colors and mascot avatar on the maps. This also applies to every team against which team X competes.

Alternative implementations include providing incentives to cover larger areas. For example, the larger the area, the greater and more prominent display of the school logo/mascot for a specified time period (e.g., a weekend). There can be utilized an incentive for freshness, for example, every week, roads that were previously driven are up for grabs again. Additionally, prizes can be periodically awarded to schools that contribute the most. Moreover, a special incentive can be given to areas that have not been previously captured or that contain a change from current data. The change can be a new route for the road, or could be a picture of a changed feature (relative to the existing data on the location), for example.

Figure 4:
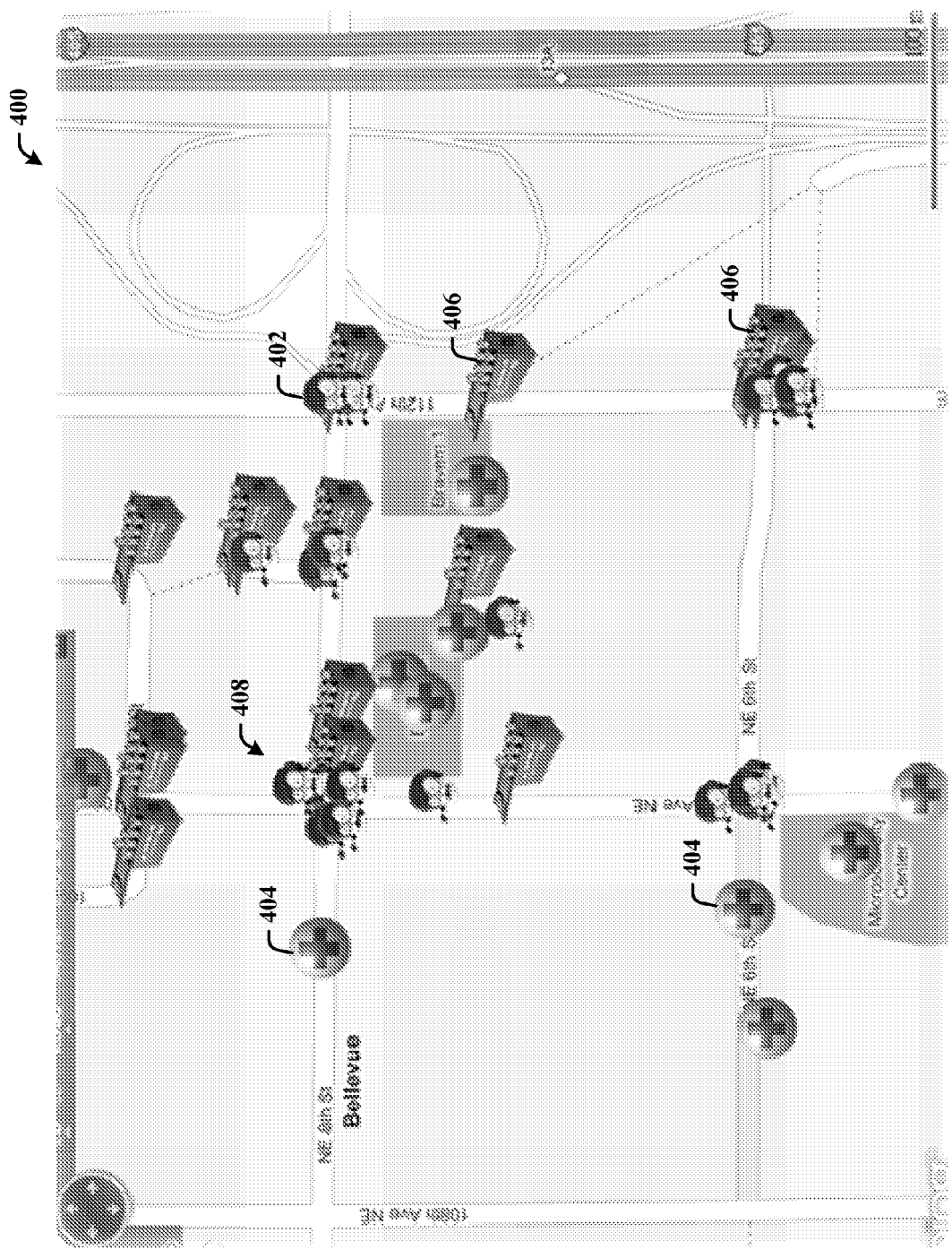
FIG. 4 illustrates a map interface of a single-player game employed in a data collection system.

FIG. 4 illustrates a map interface 400 of a single-player game employed in a data collection system. The map interface 400 is created by the game server and sent to the user device. The game client (e.g., client 206) of the user device (e.g., mobile device 104) launches and presents the map interface 400 to the user. Note that it can also be the implementation that the user receives the map interface 400 as a document (e.g., jpg, tiff, etc.) via any suitable communications program such as email, instant messaging, etc., to user computer system, and can then choose to engage in the gameplay via a suitable gameplay device (e.g., a plastic gun with a see-through camera lens). The user can then choose to participate in the game, or opt out of the gameplay.

Here, the game involves foes 402, and resources (e.g., medical resource 404 and ammunition resource 406). The user plays against the foes 402, and the foes 402 attempt to harm the user. The user plays by shooting the foes 402, thereby expending ammunition. Thus, the user needs to continue to resupply ammunition by selecting an ammunition resource 406. When the foes 402 harm the user, the user then requires a medical resource 404 to rejuvenate and continue play.

As the user successfully neutralizes (shoots) a foe 402, the act of shooting the foe 402 also causes a camera of the user device to capture the physical geographic location at which the camera is pointed. The system then determines if the captured image is of a quality suitable for keeping. If so, the foe is deleted. However, if the captured image is not of sufficient quality, the system generates another foe that the user will be enticed (incentivized) to shoot, and hence, capture another image of the location. This can continue from several different angles, for example.

The map interface 400 enables the participating user to choose where to engage in the gameplay. For example, the user can choose to go (e.g., walk, drive) to an intersection 408 where there are many foes 402 to shoot, and hence, accumulate a high score more quickly. The larger number of foes 402 indicates that the system wants more images of that geographic location as updates and/or validation purposes. The intersection 408 also shows to have additional ammunition resources 406 and medical resources 404, if needed.

Figure 5:
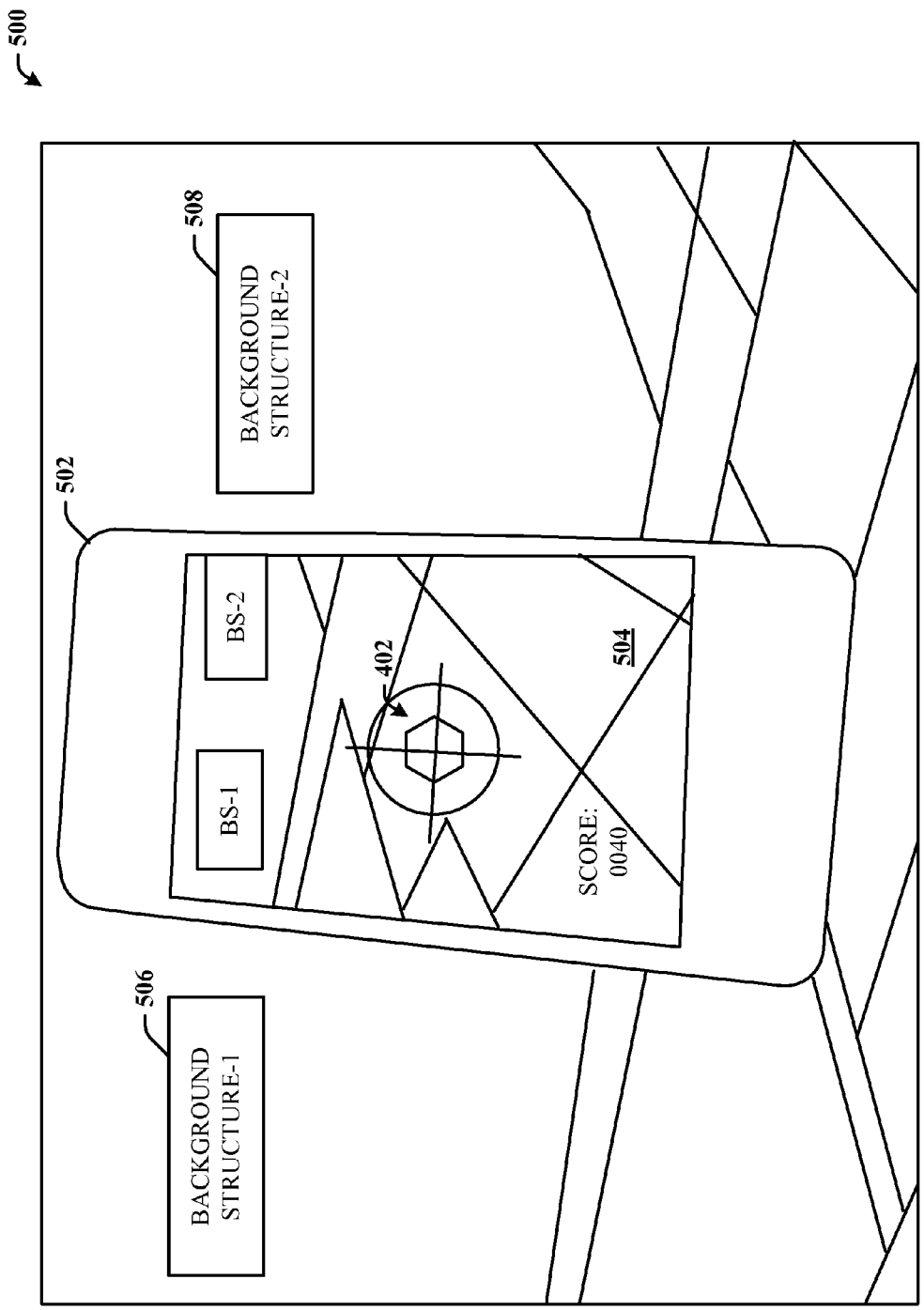
FIG. 5 illustrates a view of exemplary gameplay device via which a user plays the single-player game of FIG. 4 employed for data collection system.

FIG. 5 illustrates a view 500 of exemplary gameplay device 502 via which a user plays the single-player game of FIG. 4 employed for data collection system. The device 502 can employ a see-through display 504 on which graphics (e.g., a foe 402) are presented in association with the geographic location of interest. Here, the location of interest can include a general view of a first background structure 506 (denoted also as BS-1 in the display 504), and a second background structure 508 (denoted also as BS-2 in the display 504). The disclosed architecture has determined that the location of interest that needs to be updated or captured for a first time includes a view of the structures (506 and 508). Accordingly, the foe 402 is positioned and presented so as to likely cause a player to obtain an acceptable image or images of the desired structures (and perhaps the surrounding area).

The display 504 presents a score that increases based on the number of points accumulated during gameplay. As the user presses a button to eliminate the foe 402, the camera of the device 502 captures an image of the scene at which the device is directed. The foe 402 is then deleted from the display 504. The image can then be uploaded and processed to determine if the quality and angle of the image meets the criteria for keeping the image. However, if the image quality is poor, or not of the right perspective, for example, the system will regenerate the foe 402 at the location for further capture of the location.

Put another way, a data collection system is provided that comprises a game component of mobile devices that execute an interactive game for gameplay by users of the mobile devices. A gameplay component provides play information to the game component. The play information offers incentives to the users that participate in the gameplay relative to a geographical location, where the geographical location is determined from a mapping service (map server) that requests geographical features of the geographical location to be updated or validated with latest data. A data collection component collects data relative to the geographical location via the mobile devices during the gameplay, and updates the mapping service according to the latest data.

The game is a multiplayer game via which multiple users participate in the gameplay to interact with targets generated in realtime on the geographical features, the mobile devices of the users capture images of the geographical features and send the images to the mapping service, the targets removed and re-presented on new geographical features during the gameplay based on acquisition of corresponding features. The mapping service processes the updates based on some or all captured images of the mobile devices.

The gameplay component imposes virtual territories on the area of interest and offers rewards in response to navigation of the geographical location during the gameplay, the navigation results in a geolocation information trail and image capture of the geographic features related to the geographical location. The incentives include an incentive to compete and win against a competing group of users and a reward includes virtual presentation of captured territory on a map that includes the geographical location using a winning team identifier.

It is to be understood that where user information (e.g., identifying geo-location information) is performed, the user is provided the option to opt-in to opt-out of allowing this information to be captured and utilized. Accordingly, a security component can be provided which enables the user to opt-in and opt-out of identifying geolocation information as well as personal information that may have been obtained and utilized thereafter. The user can be provided with notice of the collection of information, for example, and the opportunity to provide or deny consent to do so. Consent can take several forms. Opt-in consent imposes on the user to take an affirmative action before the data is collected. Alternatively, opt-out consent imposes on the subscriber to take an affirmative action to prevent the collection of data before that data is collected. This is similar to implied consent in that by doing nothing, the user allows the data collection after having been adequately informed. The security component ensures the proper collection, storage, and access to the user information while allowing for the dynamic selection and presentation of the content, features, and/or services that assist the user to obtain the benefits of a richer user experience and to access to more relevant information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
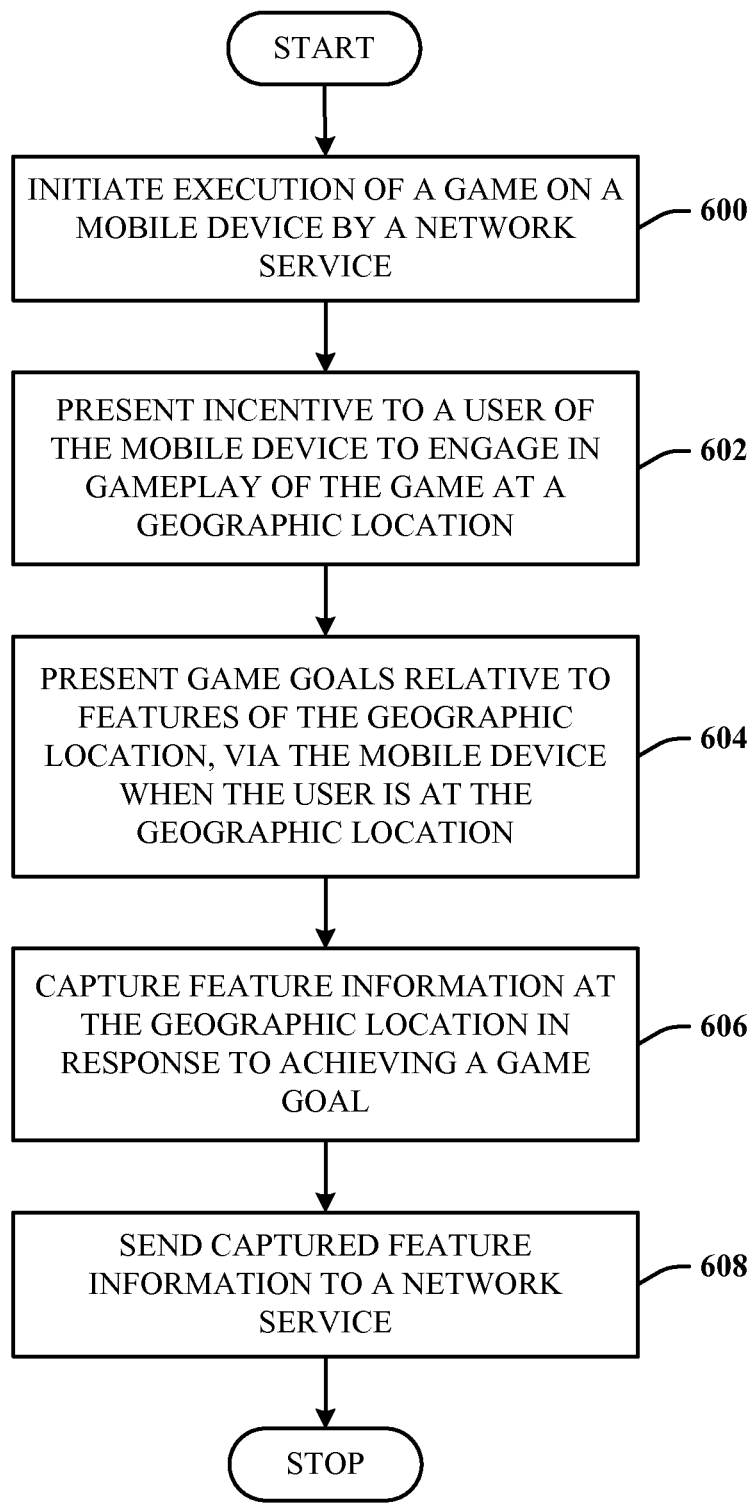
FIG. 6 illustrates a data collection method in accordance with the disclosed architecture.

FIG. 6 illustrates a data collection method in accordance with the disclosed architecture. At 600, execution of a game (e.g., video) is initiated on a mobile device by a network service. At 602, an incentive is presented to a user of the mobile device to engage in gameplay of the game at a geographic location. At 604, game goals are presented relative to features of the geographic location, via the mobile device when the user is at the geographic location. At 606, feature information at the geographic location is captured in response to achieving a game goal. At 608, the captured feature information is sent to a network service.

Figure 7:
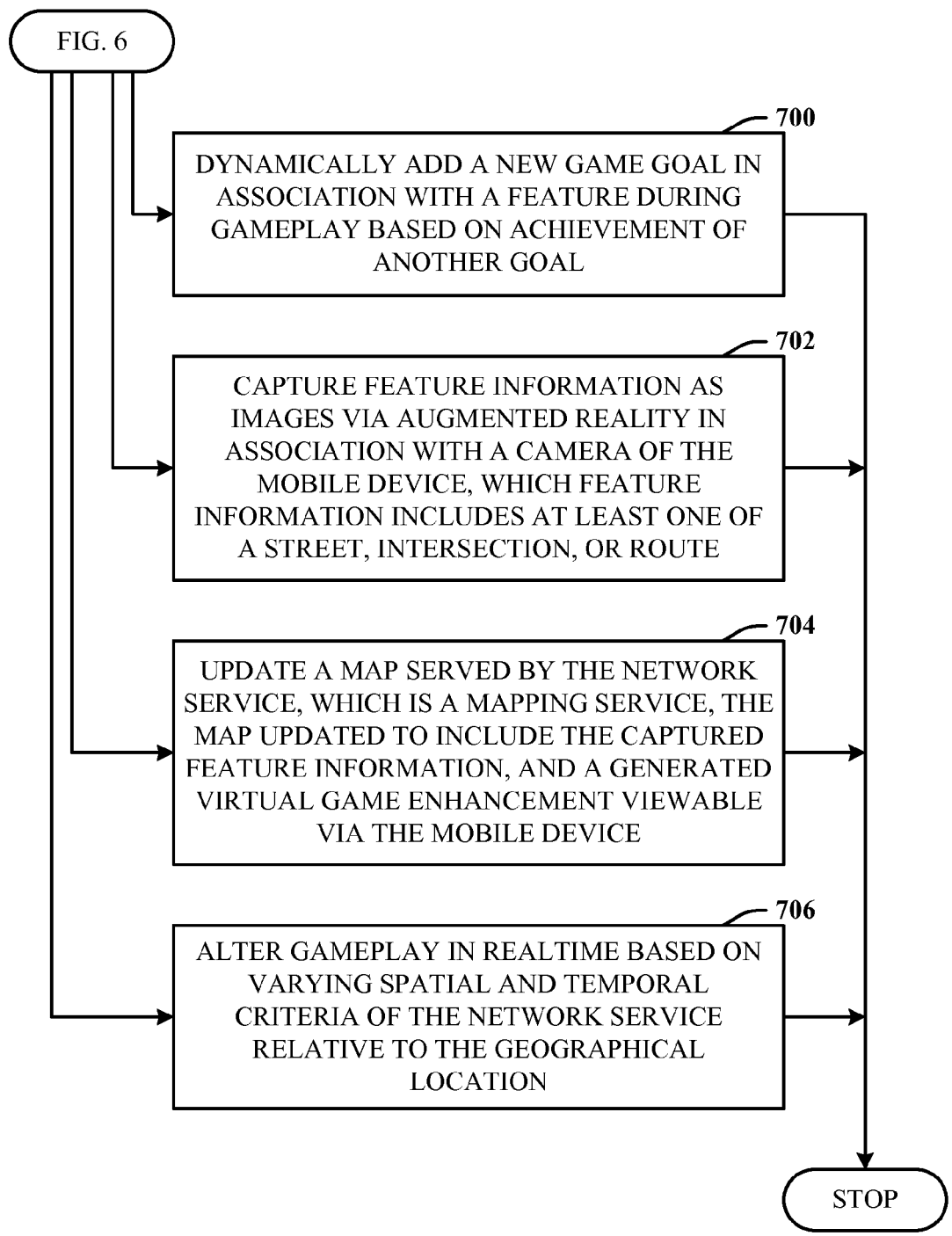
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, a new game goal is dynamically added in association with a feature during gameplay based on achievement of another goal. At 702, the feature information is captured as images via augmented reality in association with a camera of the mobile device, which feature information includes at least one of a street, intersection, or route. At 704, a map served by the network service, which is a mapping service, is updated; the map is updated to include the captured feature information, and a generated virtual game enhancement viewable via the mobile device. At 706, the gameplay is altered in realtime based on varying spatial and temporal criteria of the network service relative to the geographical location.

Figure 8:
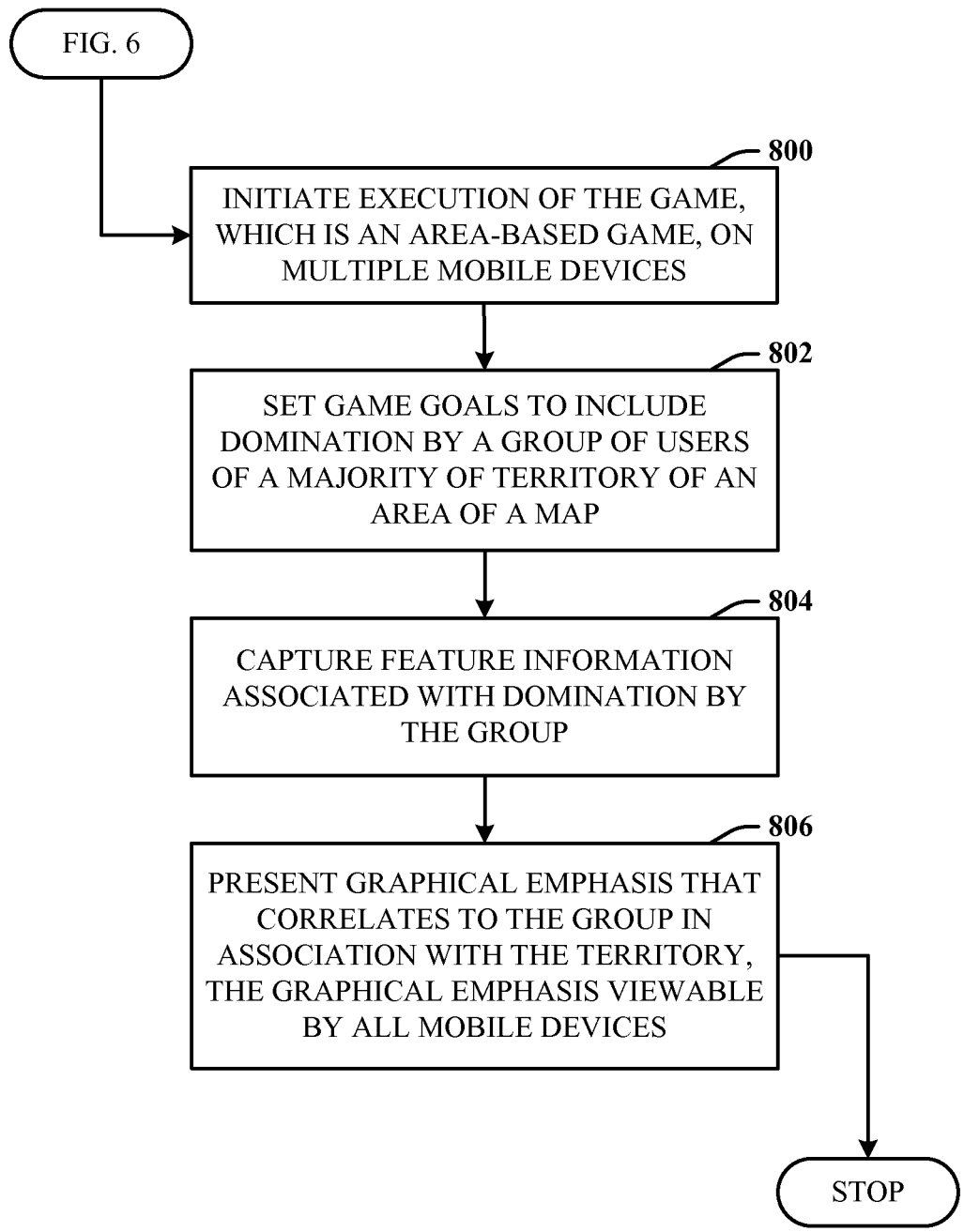
FIG. 8 illustrates further aspects of the method of FIG. 6.

FIG. 8 illustrates further aspects of the method of FIG. 6. Note that the flow indicates that each block can represent a step that can be included, separately or in combination with other blocks, as additional aspects of the method represented by the flow chart of FIG. 6. At 800, the execution of the game is initiated, which is an area-based game, on multiple mobile devices. At 802, the game goals are set to include domination by a group of users of a majority of territory of an area of a map. At 804, feature information associated with domination by the group is captured. At 806, graphical emphasis is presented that correlates to the group in association with the territory, the graphical emphasis viewable by all mobile devices.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
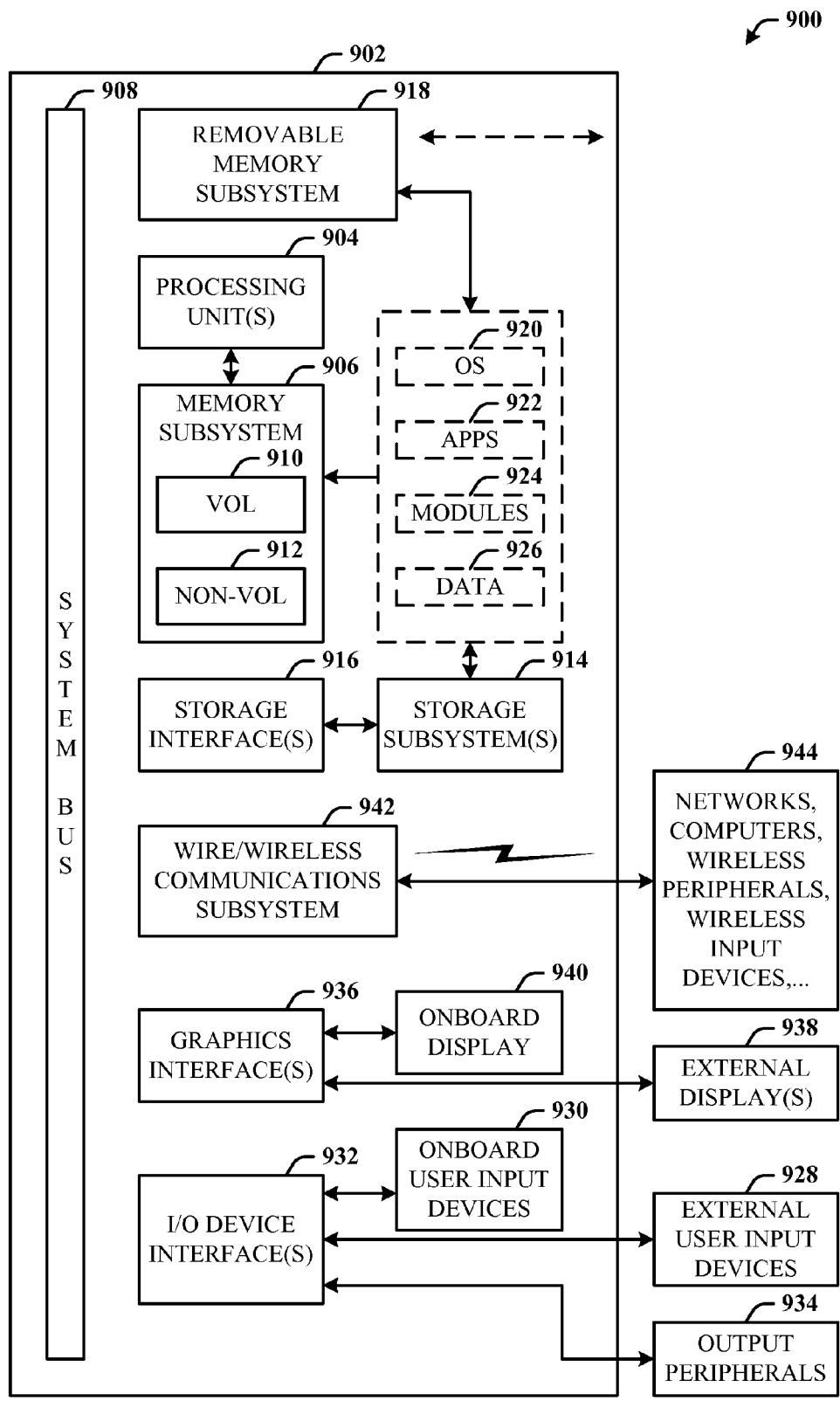
FIG. 9 illustrates a block diagram of a computing system that executes data collection in accordance with the disclosed architecture.

Referring now to FIG. 9, there is illustrated a block diagram of a computing system 900 that executes data collection in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include entities and components of the system 100 of FIG. 1, entities and components of the system 200 of FIG. 2, entities and components of the system 300 of FIG. 3, the map interface 400 of FIG. 4, view 500 and display of the device of FIG. 5, and the methods represented by the flowcharts of FIGS. 6-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data collection system, comprising:
    a game component of a mobile device that executes an interactive game for gameplay by a user of the mobile device;
    a gameplay component that provides play information to the game component, the play information includes an incentive to motivate the user to participate in the gameplay relative to a geographical location, wherein the game component communicates with an online mapping service that provides a map of an area of interest in which the gameplay occurs, the gameplay component imposes the virtual territories on the area of interest and incentivizes users of mobile devices with rewards in response to navigation of the area of interest as part of the gameplay, the navigation results in a geolocation information trail which is utilized to map the area of interest;
    a data collection component that collects data related to the geographical location during the gameplay; and
    a microprocessor that executes computer-executable instructions associated with at least one of the game component, the gameplay component, or the data collection component.

2. The system of claim 1, wherein the data collection component includes sensors of the mobile device, the sensors include a camera that captures images of the geographic location during the gameplay.

3. The system of claim 1, wherein the gameplay component receives previously captured data associated with a stale geographic location and updates the previously captured data via the mobile device during gameplay.

4. The system of claim 1, wherein the gameplay component receives previously captured location data associated with a geographic location that is stale and dynamically influences the gameplay via the play information to occur at the geographic location to update the location data of the geographic location.

5. The system of claim 1, wherein the gameplay component receives previously captured location data associated with a geographic location that is stale and dynamically influences the gameplay via the play information to occur at the geographic location to validate current state of the location data for the geographic location.

6. The system of claim 1, wherein the collected data is uploaded from the mobile device to an online data source to update vector and topological information of a geographical mapping system.

7. The system of claim 1, wherein the data collection component includes sensors of the mobile device, the sensors include at least one of a microphone that captures audio signals associated with the location, an accelerometer that captures orientation data of the device, or a geolocation subsystem.

8. The system of claim 1, wherein the incentive is to compete and win against a team of competing users and the reward includes graphically and virtually presenting captured territory on the map of the area of interest in accordance with a winning team identifier.

9. The system of claim 1, wherein the gameplay component incentivizes the gameplay, which is according to an area-based game, in a geographical area of interest desired to be mapped or validated, an incentive is a group identifier virtually presented in association with captured or navigated territory of an online map of the area of interest.

10. A data collection system, comprising:
a game component of mobile devices that execute an interactive game for gameplay by users of the mobile devices;
a gameplay component that provides play information to the game component, the play information offers incentives to the users that participate in the gameplay relative to a geographical location, the geographical location determined from a mapping service that requests geographical features of the geographical location to be updated or validated with latest data, wherein the game is a multiplayer game via which multiple users participate in the gameplay to interact with targets generated in realtime on the geographical features, the mobile devices of the users capture images of the geographical features and send the images to the mapping service, the targets removed and re-presented on new geographical features during the gameplay based on acquisition of corresponding features;
a data collection component that collects data relative to the geographical location via the mobile devices during the gameplay, and updates the mapping service according to the latest data; and
a microprocessor that executes computer-executable instructions associated with at least one of the game component, the gameplay component, or the data collection component.

11. The system of claim 10, further comprising a database of previously captured data associated with geographic locations, received by the gameplay component to dynamically influence the gameplay to occur at a geographic location to update location data of the geographic location that is stale and to validate current state of the location data.

12. The system of claim 10, wherein the mapping service processes the updates based on some or all captured images of the mobile devices.

13. The system of claim 10, wherein the gameplay component imposes virtual territories on the area of interest and offers rewards in response to navigation of the geographical location during the gameplay, the navigation results in a geolocation information trail and image capture of the geographic features related to the geographical location.

14. The system of claim 13, wherein the incentives include an incentive to compete and win against a competing group of users and a reward includes virtual presentation of captured territory on a map that includes the geographical location using a winning team identifier.

15. A data collection method performed by a computer system executing machine-readable instructions, the method comprising acts of:
initiating execution of a game, which is an area-based game, on multiple mobile devices by a network service;
presenting an incentive to a user of the mobile devices to engage in gameplay of the game at virtual territories imposed onto a geographic location;
presenting game goals relative to features of the geographic location, via the mobile devices when the user is at the geographic location;
setting the game goals to include domination by a group of users of a majority of territory of an area of a map;
capturing feature information at the geographic location in response to achieving a game goal associated with domination by the group;
sending the captured feature information to a network service; and
presenting graphical emphasis that correlates to the group in association with the territory, the graphical emphasis viewable by all mobile devices.

16. The method of claim 15, further comprising dynamically adding a new game goal in association with a feature during gameplay based on achievement of another goal.

17. The method of claim 15, further comprising capturing the feature information as images via augmented reality in association with a camera of the mobile device, which feature information includes at least one of a street, intersection, or route.

18. The method of claim 15, further comprising updating a map served by the network service, which is a mapping service, the map updated to include the captured feature information, and a generated virtual game enhancement viewable via the mobile device.

19. The method of claim 15, further comprising altering the gameplay in realtime based on varying spatial and temporal criteria of the network service relative to the geographical location.

20. The method of claim 15, wherein the gameplay comprises generating a foe such that successfully neutralizing the foe also causes a camera of the mobile devices to capture an image of a physical geographic location at which the camera is pointed.

* * * * *